3,288,734
PHENOLIC-FORMALDEHYDE RESOLE-POLYMER-
IZED UNSATURATED FATTY ACID MODIFIED
BINDER COMPOSITION FOR BONDED MAT
Joseph P. Stalego, Newark, Ohio, assignor to Owens-
Corning Fiberglas Corporation, a corporation of Delaware
No Drawing. Filed Apr. 3, 1963, Ser. No. 270,157
10 Claims. (Cl. 260—7)

This invention relates to a binder composition which is especially adapted for use in connection with glass or other vitreous fibers in mat form, and, more particularly, to a hardenable, aqueous binder composition containing a polymerized fatty acid, such as a dimerized or trimerized unsaturated fatty acid having a chain length of 10 to 22 carbons, a water-soluble starch, a water-soluble, hardenable phenolic resin, such as a heat-hardenable phenol-formaldehyde resole, and a dispersing agent for the polymerized fatty acid, such as bone glue.

Bonded mats and boards of intermeshed glass and other vitreous fibers have been extensively produced heretofore. Such bonded mats are produced in a number of different manners. Generally though, random or uniform length fibers or strands, chopped or continuous length filaments or strands of a material, such as glass, or mixtures thereof, are produced in any of the well known ways, such as by a continuous filament process, a rotary or centrifugal process, a steam- or other fluid-blown process, or a like process, and the fibers, filaments, strands, or mixtures are collected as a tangled, intermeshed, web-like mass on a suitable collecting means such as a foraminous conveyor. The collected mass then is impregnated, such as by immersion, dipping, spraying, roll coating, or the like with a suitable hardenable binder, which is subsequently cured and hardened, as by passing the impregnated mass through a heated oven. The curing and hardening can be carried out with the fibers compressed or compacted, if desired, and a board-like product of an apparent density of as high as about 12 pounds per cubic foot can be produced, or, if no compression is applied during the curing or hardening, products of much lower apparent density can be produced. Various materials of this type have been produced and have found widespread use for protective purposes and as thermal and acoustical insulating materials. For example, one widespread use is the wrapping of lengths of such bonded mat around pipes, conduits, and the like, for protective and insulating purposes, and another widespread use is as a battery separator sheet.

Binder formulations for such mat products generally are aqueous dispersions. Aqueous dispersions are quite desirable for economic reasons and ease of application. Production of a variety of products, which may range in apparent density and differ in other respects, is readily possible by control of the solids content of the aqueous dispersion and by control of the amount of dispersion applied to the fibrous mass.

The binder formulation contains a cementing constituent, generally resinous in nature, which, after application to the fibers and curing thereof, provides a suitable tackiness, degree of flexibility and rigidity, and structural stability in the fibrous mat. The cementing constituent serves to bond and lock fibers and filaments together at numerous junctions and intersections thereof. Particularly useful and in widespread use as a cementing or bonding constituent have been organic resins, and, in particular, heat-hardenable phenolic resins, usually a resole of the phenol-formaldehyde type. Such a resole is readily dispersed or dissolved in the water, can be applied readily to the fibrous mass, and is cured easily by heating, which also drives off the water, and produces a bonded mat of satisfactory strength and structural stability. In addition to the cementing or binding agent, such aqueous binding formulations generally contain a number of other constituents to impart desirable properties to the bonded mat. These other constituents may or may not be present, but generally are included for purposes well known in the art. For example, a binder formulation may contain such constituents as plasticizers, fillers, coupling agents, sizing agents, lubricants, tackifiers, and the like.

Particularly desirable binder compositions for the production of pipe insulation wrappings and the like are those compositions, which, after hardening or cure thereof, impart sufficient flexibility to the bonded mat that bending and wrapping around various contours is possible, while the mat still retains a substantial permanent structure. Large amounts of rigid or inflexible binder within a bonded mat cause the mat to fracture and fragment upon being bent or flexed sharply. Generally, the binder formulation includes a plasticizer for the cementing constituent to eliminate such difficulties. Another desirable property for bonded mat is an absence of excessive dusting or "fly." A "level of fly" for a bonded mat is the tendency of short fiber lengths, loose ends of fibers, and broken fibers and filaments to project and to dust off and break away from the bonded mat. For convenient handling and to avoid resistance or reluctance of workers to handle the mat it is desirable that this "level of fly" be extremely low. The "level of fly" can be minimized by use of a cured binder of a suitable tackiness. Such a suitable tackiness serves to entrap and hold loose material, which would otherwise increase fly. The tackiness of the binder, however, should be sufficiently low that the bonded mat does not have an excessively tacky feel when handled. "Level of fly" can be evaluated in several different ways. In one evaluation a portion of a bonded mat is flexed, and dust, fragments of mat, and fibers breaking off of the mat are collected and weighed. In another evaluation of "level of fly," a bonded mat is moved back and forth over a horizontal coarse screen through which air is being downwardly exhausted: dust, fibers, fragments, and the like, which separate from the mat and collect below the coarse screen on a filter, are a measure of the "level of fly" of the bonded mat upon handling.

The present invention is based on the discovery of a binder composition for use with glass or other vitreous fibers in bonded mat structures, which composition provides a flexible, creasable, mat having a low level of fly without sacrifice of strength and other properties of the mat. The binder composition per se is relatively stable after preparation thereof before use, being more stable, for example, than a conventionally employed furfuryl alcohol-type binder. The binder composition of the invention also is less susceptible to foaming than numerous conventional binders and may be used generally with less loss of binder and build-up of binder on the conveyor or like fiber-collecting surface by which the mat is generally carried for curing. Bonded mat structures produced from the improved binder of the invention also have a suitable tackiness, which may be varied, as desired, by variation of the extent of cure of the binder composition.

It is, therefore, an object of the invention to provide an improved binder composition for bonded fibrous mat and the like.

It is another object of the invention to provide a method for producing an improved binder composition.

It is still another object of the invention to provide an improved bonded fibrous mat containing the binder composition of the invention in a cured or hardened state.

It is a further object of the invention to provide a hardenable binder composition which consists essentially of a polymerized fatty acid, a dispersing agent for the polymerized fatty acid, a hardenable phenolic resin, a starch, and bone glue or another dispersing agent for the polymerized acid.

Other objects and advantages will be apparent from the description which follows, which is intended only to illustrate and to disclose, and in no way to limit the invention.

According to the invention, there is provided an improved binder composition for bonded fibrous mat. Such composition in an aqueous formulation having a solids content from about 5 percent[1] to about 35 percent, and preferably from about 12 percent to about 22 percent. The solids of a particularly useful binder composition consist essentially of about 25 percent of bone glue as a dispersing agent, about 25 percent of a dimerized unsaturated fatty acid of 18 carbon atoms chain length, about 30 percent of starch, and about 20 percent of a heat-hardenable phenol-formaldehyde. Preferably the solids consist essentially of from 20–30 percent of a polymerized fatty acid, from 20–55 percent of a water-soluble, solid dispersing agent, preferably bone glue, for the polymerized fatty acid, from 20–55 percent of a film-forming, water-soluble starch, and from about 15–25 percent of a heat-hardenable phenol-formaldehyde resole. Essential constituents of the aqueous binder formulation of the invention are the polymerized fatty acid, the film-forming starch, the heat-hardenable resole, and the bone glue or other dispersing agent. At least some of each of the essential constituents must be included in the fibrous mat binder composition to achieve the improved results of the invention. In its broadest aspects, the binder composition solids should contain at least 5 percent each of the polymerized fatty acid and bone glue or other dispersing agent, at least 10 percent of the phenolic resole, and sufficient starch that the total of starch and bone glue or equivalent is from 35 percent to 75 percent, and may contain up to about 40 percent of a polymerized fatty acid, up to about 70 percent of a dispersing agent for the polymerized fatty acid, up to about 70 percent of a water-soluble starch, and up to about 35 percent of a heat-hardenable phenolic resole.

The polymerized fatty acid in the aqueous binder composition serves as a plasticizer and tackifier. By varying the amount of the polymerized fatty acid, the extent of cure of the binder composition, or both, it is possible to control and vary the tackiness and flexibility of the cured composition over wide ranges. For example, a cured composition may be obtained which has a suitable and desired tackiness providing a low and satisfactory level of fly and also which has a suitable and desired flexibility. Polymerized fatty acids are essentially the dimer and trimer fatty acids resulting from polymerization, or dimerization or trimerization of unsaturated natural and synthetic fatty acids. The conventionally polymerized unsaturated fatty acids are the higher unsaturated fatty acids having a chain length of from about 10–22 carbon atoms, those having a chain length of 16 and 18 carbon atoms generally being preferred. Particularly useful are oleic, linoleic and linolenic acids and various mixtures of such unsaturated acids, particularly mixtures of palmitic and oleic acids. One method of preparation of polymerized fatty acids is to heat the unsaturated fatty acids under pressure in the presence of steam. As a result of such treatment, linkages, mainly located at the points of unsaturation in the acid molecules, are formed between two, or among three or more, molecules of fatty acids to produce the dimers, trimers, and higher polymers of the fatty acids. When two molecules of the fatty acid link, a dibasic acid is produced; when three molecules are linked, a tribasic acid is produced. Generally, most polymerization methods produce mixtures of dibasic, tribasic and polybasic acids. Polymerized fatty acids are represented by the following formula:

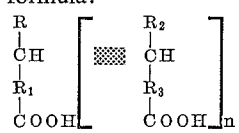

wherein the shaded area represents an undetermined linkage between two unsaturated fatty acids, which linkage varies depending to a great extent on the particular fatty acids, the type of polymerization, and the polymerization conditions and may range from a single carbon-to-carbon bond to a more complex linkage of a divalent alkenyl radical, or even a complex cyclic structure; wherein $n$ is a lower whole number integer, other than 0, and preferably from 1 to 4; and wherein the various R groups are straight chain hydrocarbon groups, not necessarily of the same chain length, with the total number of carbon atoms in the two R groups found in each fatty acid grouping of the polymerized fatty acid structure being from about 8 to 20. At least one of the R groups may contain an unsaturated carbon-to-carbon linkage, as can the linking group designated by the shaded area. However, any unsaturation present in the polymerized fatty acid is relatively inactive. This lack of reactivity of any points of unsaturation in the polymerized fatty acid structure is evidenced by a slow rate of reaction or an incomplete reaction when the polymerized fatty acids are subjected to such conventional reactions for a carbon-to-carbon double bond as hydrogenation, sulfonation, and maleic anhydride condensations. Generally, unsaturated natural fatty acids are used to produce the polymerized fatty acids. These unsaturated fatty acids usually are a mixture of two or more acids and the resulting polymerized fatty acids are mixed polymerized fatty acids, preponderantly mixed fatty acid dimers and trimers, with only a relatively small amount of unreacted fatty acid or higher polymer being present. Such mixtures of mixed polymerized fatty acids are satisfactory and suitable constituents as well as those polymerized unsaturated fatty acids derived from a single unsaturated fatty acid. Polymerized fatty acids are of a more fluid nature than are either the corresponding unsaturated fatty acids from which they are produced or the corresponding saturated fatty acid counterparts, although like their counterparts they are relatively insoluble in water.

Because of the relative insolubility of the polymerized fatty acids in water it is necessary to employ a dispersing agent to disperse these materials in an aqueous formulation. It appears that any agent which is capable of dispersing the polymerizable fatty acid in water may be used. The exact nature of the dispersing agent appears to be relatively unimportant. Particularly useful are various peptizing agents, such as glues, gelatins, soaps, gum arabic, dextrin, various synthetic dispersing agents, ammonia, morpholine, and the like. The use of a dispersing agent assures adequate dispersion of the polymerized fatty acid in the formulation and also provides a relatively stable formulation in which the dispersed state can be maintained until use. Bone blue, in common with other amino acids, is a peculiarly effective dispersing agent, because the amino and carboxyl groups thereof are reactive with the phenolic resole during cure of the latter, and prior to cure the amino groups are reactive with the carboxyl groups of the dimerized, trimerized or the like acid, as a consequence of this reactivity, the dispersing agent, when a bone glue or another amino acid, ---
[1] The terms "percent" and "parts" are used herein, and in the appended claims, to refer to percent and parts by weight, unless otherwise indicated.

is chemically combined with the final mat binder, and chemically combines the acid therewith.

A water-soluble starch and a phenolic resole constitute the remaining essential constituents of the binder composition. These materials, due to their inherent natures, are readily incorporated into an aqueous formulation and readily provide an aqueous binder composition of adequate stability for conventional handling and storage, if desired, before use. It is believed that the starch and the phenolic resole along with the polymerized fatty acid and the bone glue, all react during curing or hardening with the resulting reaction product functioning as the film-forming and cementing agent which cements and anchors fibers and filaments at their points of intersection and interstices into a relatively stable mat structure.

The exact nature of the starch employed is relatively unimportant, so long as it may be readily dissolved or dispersed in water. Preferably, the starch consists essentially of amylose, the water soluble component of ordinary starch. However, the starch may contain amylopectin in samll amounts. Cationic starches and pre-dextrinized starches are also suitable.

The phenolic resole may be any of the custamory resoles employed in aqueous binder compositions. Such resoles are from the group consisting of phenol-formaldehyde partial condensation products and phenol-amino-compound-formaldehyde partial condensation products. Such phenolic resoles are known to the art. These resoles preferably have a comparatively high water tolerance as frequently it is desirable to employ a relatively dilute aqueous binder formulation. Where punk resistance of the bonded mat is important, a phenol-amino compound-formaldehyde partial condensation product preferably is employed.

The following examples are presented solely for the purpose of illustrating and disclosing the invention.

EXAMPLE 1

About 300 gallons of a binder composition containing about 15 percent solids was prepared in a suitable mixing tank which was provided with a propeller-type agitator. In the binder preparation, the constituents listed below, were added, in the amounts and in the order listed, with constant agitation and thorough mixing after addition of each constituent before addition of the next.

Water (at a temperature of 170–190° F.) _____ 624 lbs. (about 75 gal.).
Bone glue (92 percent solids content, balance essentially $H_2O$) _____ 100 lbs.
Dimer acid [1] (100 percent solids) _____ 95 lbs.
Water-soluble starch _____ 96 lbs.

[1] The dimer acid consisted essentially of a mixture of about 71 percent of a 36-carbon, dibasic acid, about 26 percent of a 54-carbon, tribasic acid, and about 3 percent of an 18-carbon, monobasic acid, resulting from the polymerization or dimerization of naturally-occurring 18-carbon, unsaturated fatty acids. The naturally-occurring 18-carbon, unsaturated fatty acids were a commercially available mixture consisting essentially of a major amount of oleic acid and minor amounts of other 18-carbon unsaturated fatty acids, such as linoleic and linolenic acids, the mixture being derived from natural fats and oils. This commercially available mixture was subjected to a conventional heat-treatment under pressure in the presence of steam to yield the dimer acid. The dimer acid was a liquid, quite viscous in nature, which had a viscosity at 25° C. of about 10,000 centistokes and at 100° C. of 80 centistokes. The dimer acid was relatively insoluble in water, but was soluble in alcohol, ether, benzene, acetone, and naphtha. Other properties of the dimer acid were:

Specific gravity at 15.5° C./15.5° C. _____ 0.95.
Flash point, ° F. _____ 530.
Acid value (mg. KOH per gram) _____ 186–194.
Unsaponifiable _____ Less than 2.0 percent.
Color, Gardner _____ Less than 11.
Neutralization equivalent _____ 289–300.
Ash content _____ Less than 0.1 percent.

Such a dimer acid also is commercially available.

Water _____ As required.
Phenolic resole [2] (40 percent solids in water) _____ 189 lbs. (about 20 gal.).

[2] The phenolic resole was what is termed "a filtered phenolic resole" and was prepared from 180 parts of formalin or 37 percent water solution of formaldehyde, 100 parts of phenol, and 4 parts of sodium hydroxide. The starting materials were mixed in a suitable vessel, allowed to stand at room temperature (about 25° C.) for approximately 16 hours, and heated at a progressively increasing temperature which was sufficient to maintain gentle boiling thereof. Heating was discontinued when the temperature of the reaction mixture reached approximately 85° C. The sodium hydroxide in the reaction mixture was then neutralized with phosphoric acid and the neutralized resin was filtered. This resin had a water dilutability factor in excess of 600. Just prior to preparation of the binder composition employing this resin as a constituent thereof, the resin was diluted with water to the desired 40 percent solids content.

The period of agitation after addition of the dimer acid was about 10 minutes before the water-soluble starch was added. The period of agitation after addition of the water-soluble starch was about 15 minutes, at which time the resulting admixture was diluted with water to a volume of about 280 gallons. After a thorough mixing therein of this water, the phenolic resole was added and mixed therein to provide a useful hardenable binder composition according to the invention.

Bonded mats of glass fibers and the like were prepared using the hardenable binder composition, produced as just described. Some mats were prepared shortly after preparation of the binder composition was completed, and others after the composition had been stored under ambient conditions for periods in excess of ten days. Although there was no change in appearance of the hardenable binder composition from such storage, the composition was stirred and agitated at least for a few minutes before use. One preparation of the bonded mat was as follows:

Steam blown glass fiber monofilaments averaging about 0.0006 inch, in diameter, but varying greatly from the average, and in random lengths ranging from less than one inch to several feet were produced and co-deposited with water by conventional means in an intermeshed mat-like mass about 0.02 inch thick on a moving foraminous conveyor. This mat structure of glass fibers then was impregnated with the binder composition by flowing the composition at about 4 percent solids on the upper surface thereof and applying vacuum to the under surface of the mat to withdraw water and some binder therefrom. The water and binder withdrawn from the mat were collected, and concentrated for re-use by addition of concentrated binder produced as described above. The mat then was placed in a curing oven and subjected to a temperature of about 400° F. for four minutes to cure the associated binder. The resulting bonded mat, after cure of the binder, consisted essentially of about 84 percent by weight of glass fibers and 16 percent by weight of cured binder, and had an apparent density of 1 pound per cubic foot. The cured mat had an average breaking strength [2] of about 56 lbs./in. width, an ignition loss of about 16 percent, and a satisfactory flexibility. In comparison therewith, a like density commercially available bonded mat made with a furfuryl-alcohol-type binder composition had an average breaking strength of about 45 lbs./in. width, an ignition loss of about 18 percent, and considerably less flexibility.

The mat was checked for level of fly by the method generally described above which involved moving the mat back and forth a fixed number of times across a horizontal surface of a coarse-meshed metal screen, through which air was being exhausted downwardly, and collecting and measuring the amount of fibers, dust, particles, and the like, which passed through the screen and were collected therebelow on a filter. For comparison with the mat produced by employing the binder composition

[2] Reported average breaking strength was the average of a plurality of strength measurement made in the middle of the mat and also at a distance in about 1/10 of the mat width from each side of the mat. These strength measurements were made by a conventional procedure.

of the invention, the level of fly also was determined in the same manner for a number of other bonded mats. Typical results of these levels of fly determinations are tabulated in Table I, which follows:

TABLE I

| Bonded Mat Description | Percent Binder in Mat | Level of Fly (Weight Loss in Grams) |
|---|---|---|
| As prepared in Example 1 | 16.0 | 0.12 |
| Comparison Examples:[1] | | |
| A | 18.1 | 0.94 |
| B | 16.1 | 0.36 |
| C | 14.5 | 0.36 |
| D | 26.2 | 0.13 |

[1] Of the comparison examples, Mat A was a commercially available bonded mat which included a binder composition consisting essentially of furfuryl alcohol, bone glue, sulfuric acid, ammonia, and a phenolic resole; Mat B was an experimental binder composition identical with that as prepared in Example 1 except that the polymerized fatty acid constituent was omitted; and Mats C and D were commercially available bonded mats.

Bonded mat, produced with the binder composition prepared as in Example 1, has been found to be suitable for underground pipe wrap mat. For this application, the bonded mat was knife coated on one surface with molten asphalt to a thickness of 35 to 40 mils, and the asphalt-coated mat was wrapped, asphalt surface facing out, around metal pipes which then were buried in the ground. In comparison with other bonded mat used for underground pipe wrap mat, such mat, produced with the binder composition of the invention, is superior thereto in many respects. The cost of the constituents in such various and different binder compositions is such that it is economically advantageous to employ the binder composition of the invention. In addition, the invention provides a bonded mat of significantly increased strength and flexibility in comparison to other known conventional bonded mats for underground pipe wrap mat. The following Table II tabulates such a comparison:

TABLE II

| Binder Description[1] | Relative Cost of Binder Solids | Strength | | | |
| | | Plain Mat | | Asphalt Coated Mat[2] | |
| | | Break Load[3] | Elongation[4] | Break Load[3] | Elongation[4] |
|---|---|---|---|---|---|
| A | 1.0 | 28.9 | 0.0138 | 46.5 | 0.0230 |
| B | 1.1 | 25.0 | 0.0112 | 41.0 | 0.0170 |
| C | 1.9 | 11.5 | 0.0108 | 41.1 | 0.0214 |

[1] Binder A was the formulation of Example I; Binder B was an aqueous binder composition consisting essentially of the bone glue and phenolic resole constituents employed in the Example I formulation; Binder C was an aqueous binder composition containing about 50 percent neoprene and the balance essentially inert fillers.
[2] With about a 35 mil thick coating of asphalt.
[3] Lbs./in. width.
[4] In./in. length.

Bonded mat samples, from which the strength data in the preceding Table II were obtained, were prepared as follows: to minimize error due to non-uniformity of the mat, all samples were prepared from an unbonded overlay mat of glass fibers. Each sample of unbonded mat was hand dipped in a binder composition, permitted to drain uniformly and cured at 400° F. for three minutes. All cured samples of bonded mat contained substantially the same amount of cured binder, i.e. about 30 percent. Strength measurements were made on an Instron tensile tester, the load elongation being recorded, and all samples were broken at a loading rate of 0.02 inch per minute.

Additional compositions have been prepared in substantially the same manner in which the composition of Example 1 was prepared. In these additional examples the amounts of the various constituents were varied over wide ranges. Table III, which follows, includes a number of these binder formulations in which the various constituents were added, in the amounts and in the descending order as listed, with constant agitation and thorough mixing during and after the addition of each constituent to obtain a uniform mixture before the addition of the next constituent.

TABLE III

| Sample No. | 2 | 3 | 4 | 5 | 6 | 7 | 8 | 9 | 10 |
|---|---|---|---|---|---|---|---|---|---|
| Percent Solids | 12 | 22 | 15 | 12¼ | 14.5 | 12 | 20 | 16 | 18 |
| Water (lbs.) | 1,043 | 1,043 | 1,043 | 1,043 | 1,043 | 1,043 | 1,043 | 1,043 | 1,043 |
| Bone Glue as a Dispersing Agent: | | | | | | | | | |
| Percent | 26.3 | 26.3 | 25.4 | 18 | 37.60 | 18 | 30 | 37 | 25 |
| Pounds | 81.5 | 168 | 98.6 | 56.9 | 141.1 | 55.73 | 157.68 | 154.14 | 117.75 |
| Water Soluble Starch: | | | | | | | | | |
| Percent | 26.3 | 26.3 | 28.4 | 48 | 27.25 | 48 | 32 | 25 | 27 |
| Pounds | 81.5 | 168 | 110.2 | 151.7 | 102.3 | 148.61 | 168.19 | 104.15 | 117.75 |
| Polymerized Fatty Acid: | | | | | | | | | |
| Percent | 26.3 | 26.3 | 28.1 | 14 | 7.63 | 12 | 19 | 23 | 30 |
| Pounds | 81.5 | 168 | 109 | 44.2 | 28.6 | 37.15 | 99.86 | 95.81 | 141.3 |
| Water (lbs.) | 1,227 | 1,219 | 1,155 | 1,221 | 1,160.6 | 1,227.4 | 1,059.4 | 1,144.4 | 1,102 |
| Phenolic Resole: | | | | | | | | | |
| Percent | 21.0 | 21.0 | 18.1 | 20 | 27.52 | 22 | 19 | 15 | 20 |
| Pounds | 65 | 134 | 70.2 | 63.2 | 103.3 | 68.11 | 99.86 | 62.49 | 94.2 |
| Cure Conditions: | | | | | | | | | |
| Temp.° F | 400 | 390 | 415 | 400 | 380 | 415 | 420 | 400 | 415 |
| Time in minutes | 4 | 4¼ | 3¾ | 4¼ | 4½ | 4 | 3¾ | 4 | 3¾ |

Each of the binder compositions listed in the preceding Table III has also been used to prepare bonded mats of glass fibers and the like. In every instance, these formulations produced commercially acceptable bonded mats.

Additional experimental work has demonstrated that various constituents of a binder composition according to the invention can be used to advantage in the proportions set forth above, depending upon the final properties that are desired in the bonded mat. In general, increasing the proportion of the dimer, trimer or higher polymer acid tends to increase the flexibility and the tackiness of the binder; increasing the starch increases the film forming properties of the binder on the mat; increasing the bone glue or other dispersing agent increases the stability of the binder composition, prior to use; and increasing the phenolic resole increases the final bond strength of the mat, and reducing any of the indicated constituents causes an opposite effect. Optimum properties for most uses are achieved when the various constituents of a binder composition according to the invention are used in the preferred proportions indicated above.

It has also been found that various phenolic resoles other than that specifically disclosed above can be used satisfactorily in compositions according to the invention. In general, such resoles are usually produced by condensing formaldehyde with phenol in a mol ratio of at least 1¼:1, but not higher than about 2¾:1. As has been indicated above, the use of a phenol-amino compound-formaldehyde polymer is ordinarily preferred where punk resistance is an important property of a binder composition according to the invention. Amino compounds that can be co-condensed with phenol include urea, thiourea, melamine and dicyandiamide. Examples of resoles which have been found to be suitable, other than that specifically disclosed above, include one produced by the same method, but wherein sulfuric acid rather than phosphoric acid was used to neutralize the sodium hydroxide condensing agent. Such a resole is known in the art as a "soluble ash" binder resin. Other resoles that have been found to be suitable include those produced as described below:

*Phenolic resin B*

This resole was produced from 58 parts of phenol, 123.4 parts of formalin (a 37 percent solution of formaldehyde in water), and 12 parts of barium hydrate ($Ba(OH)_2 8H_2O$). These starting materials were mixed in a suitable vessel and heated with constant stirring by a propeller-type agitator. The charge first was heated to 110° F. and maintained at this temperature for approximately 3 hours, and then heated to and held at 120° F. for 5 hours, and finally was heated to and held at 140° F. for 2 hours. At this time the reaction mixture had a refractive index of 1.4620 and an infra-red absorption analysis thereof indicated that it was substantially free of unreacted phenol and also of methylene groups. The reaction mixture had a free formaldehyde content of approximately 3.6 percent. The reaction product was then cooled to approximately 100° F., and neutralized with sulfuric acid to a pH of about 7.5. A 23.2 part charge of melamine was then added, and the resulting mixture, while under agitation, was heated to and maintained at approximately 140° F. for an additional 2 hour period. The reaction products were then cooled to approximately 75° F., and neutralized with further sulfuric acid to a pH of approximately 7.2. The reaction products had a free formaldehyde content of approximately ½ percent. Substantially all of the barium hydroxide catalyst was precipitated as barium sulfate, and the final product was substantially free of soluble ions. The final product was diluted with water to 40 percent solids.

*Phenolic resin C*

This resole was produced in the same manner as was phenolic resin B, except that an equivalent amount of dicyandiamide was substituted for the melamine.

*Phenolic resin D*

This resole was produced in the same manner as was phenolic resin B, except that an equivalent amount of urea was substituted for the melamine.

So far as can be ascertained, the source for starch in a binder composition according to the invention is immaterial. Starch from corn is completely suitable, and from either part of the kernel, as is starch from wheat, rye, barley and other grains.

It will be apparent that various changes and modifications can be made from the specific details set forth herein without departing from the spirit and scope of the invention as defined in the appended claims.

What I claim is:

1. A hardenable, aqueous binder composition containing from 12 to 22 percent of solids consisting essentially of from 5 to 35 percent of polymerized unsaturated fatty acids having a chain length of from 10 to 22 carbon atoms and from 10 to 40 percent of a heat-hardenable phenol-amino compound-formaldehyde resole wherein the formaldehyde to phenol mol ratio is at least 1¼:1 but not greater than about 2¾:1, 5–60 percent of bone glue, and up to about 50 percent of a water soluble film-forming constituent selected from the group consisting of starch, dextrinized starch and cationic starches, provided that the sum of bone glue and film former is from 35 percent to 75 percent.

2. A glass fiber mat structure wherein fibers of the structure are bonded to one another at points of contact by the composition of claim 1 in a hardened, cured state.

3. A hardenable, aqueous binder composition for fibrous structures, which composition contains from 5 percent to 35 percent of solids consisting essentially of from 5 percent to 40 percent of polymerized unsaturated fatty acids having a chain length of from 10 to 22 carbon atoms, from 10 percent to 40 percent of a heat-hardenable phenol-formaldehyde resole wherein the formaldehyde to phenol ratio is at least 1¼:1 but not greater than about 2¾:1, from 5 percent to 70 percent of a water-soluble solid dispersing agent for the polymerized fatty acids, and up to about 70 percent of a water-soluble film-forming constituent selected from the group consisting of starch, dextrinized starch, and cationic starch, provided that the sum of the dispersing agent and film former is from 35 percent to 75 percent.

4. A glass fiber mat structure wherein fibers of the structure are bonded to one another at points of contact by the composition of claim 3 in a hardened, cured state.

5. A hardenable, aqueous binder composition for fibrous structures, which composition contains from 5 percent to 35 percent of solids consisting essentially of from 20 percent to 30 percent of dimers and trimers of unsaturated fatty acids having a chain length of from 16 to 18 carbon atoms, from 15 percent to 25 percent of a heat-hardenable phenol-formaldehyde resole wherein the formaldehyde to phenol mol ratio is at least 1¼:1 but not greater than about 2¾:1, from 20 percent to 55 percent of bone glue as a water-soluble solid dispersing agent for the polymerized fatty acids, and from 20 percent to 55 percent of a water-soluble film-forming constituent selected from the group consisting of starch, dextrinized starch, and cationic starch, provided that the sum of the bone glue dispersing agent and film former is from 35 percent to 75 percent.

6. A glass fiber mat structure wherein fibers of the structure are bonded to one another at points of contact by the composition of claim 5 in a hardened, cured state.

7. A method for preparing a hardenable binder composition comprising dissolving in water a water soluble solid dispersing agent for a polymerized fatty acid, dispersing in the resulting solution, with agitation, polymers of unsaturated fatty acids having a chain length of from 10 to 22 carbon atoms, and mixing with the resulting dispersion a heat hardenable phenol-amino compound-formaldehyde resole wherein the formaldehyde to phenol mol ratio is at least 1¼:1 but not greater than about 2¾:1 and a water soluble film-forming constituent selected from the group consisting of starch, dextrinized starch and cationic starch, and wherein the proportions of the several ingredients are such that the binder composition has a solids content of from 5 percent to 35 percent, and the solids consist essentially of from 5 percent to 40 percent of the polymerized unsaturated fatty acids, from 10 percent to 40 percent of the heat-hardenable phenolic resole, from 5 percent to 70 percent of the water-soluble solid dispersing agent, and up to about 70 percent of the water-soluble film-forming constituent, provided that the sum of the dispersing agent and film former is from 35 percent to 75 percent.

8. A method for preparing a hardenable binder composition comprising dissolving in water bone glue as a dispersing agent for a polymerized fatty acid, dispersing in the resulting solution, with agitation, polymers of unsaturated fatty acids having a chain length of from 10 to 22 carbon atoms, and mixing with the resulting dispersion a heat hardenable phenol-formaldehyde resole wherein the formaldehyde to phenol mol ratio is at least 1¼:1 but not greater than about 2¾:1 and a water soluble film-forming constituent selected from the group consisting of starch, dextrinized starch and cationic starch, and wherein the proportions of the several ingredients are such that the binder composition has a solids content of from 12 percent to 22 percent, and the solids consist essentially of from 5 percent to 35 percent of the polymerized unsaturated fatty acids, from 10 percent to 40 percent of the heat-hardenable phenolic resole, from 5 percent to 60 percent of the bone glue and up to about 50 percent of the water-soluble film-forming constituent, provided that the sum of the bone glue and film former is from 35 percent to 75 percent.

9. A method for preparing a hardenable binder composition comprising dissolving in water bone glue as a dispersing agent for a polymerized fatty acid, dispersing in the resulting solution, with agitation, dimers and trimers of unsaturated fatty acids having a chain length of from 16 to 18 carbon atoms, and mixing with the resulting dispersion a heat hardenable phenol-formaldehyde resole wherein the formaldehyde to phenol mol ratio is at least 1¼:1 but not greater than about 2¾:1 and a water soluble film-forming constituent selected from the group consisting of starch, dextrinized starch and cationic starch, and wherein the proportions of the several ingredients are such that the binder composition has a solids content of from 5 percent to 35 percent, and the solids consist essentially of from 20 percent to 30 percent of the polymerized unsaturated dimers and trimers, from 15 percent to 25 percent of the heat-hardenable phenolic resole, from 20 percent to 55 percent of the bone glue, and from 20 percent to 55 percent of the water-soluble film-forming constituent, provided that the sum of the bone glue and film former is from 35 percent to 75 percent.

10. A method for producing a bonded mat of glass fibers which includes the steps of impregnating the mat structure of glass fibers with a hardenable, aqueous binder composition, which composition contains from about 5 percent to about 35 percent of solids consisting essentially of from 5 percent to 40 percent of polymerized unsaturated fatty acids having a chain length of from 10 to 22 carbon atoms, from 10 percent to 40 percent of a heat-hardenable phenol-formaldehyde resole wherein the formaldehyde to phenol mol ratio is at least 1¼:1 but not greater than about 2¾:1, from 5 percent to 70 percent of a water-soluble solid dispersing agent for the polymerized fatty acids, and up to about 70 percent of a water-soluble film-forming constituent selected from the group consisting of starch, dextrinized starch, and cationic starch, provided that the sum of the dispersing agent and film former is from 35 percent to 75 percent, and heating the binder composition to cause hardening thereof.

References Cited by the Examiner
UNITED STATES PATENTS

| | | | |
|---|---|---|---|
| 1,908,004 | 5/1933 | Zola | 260—17.4 |
| 1,959,433 | 5/1934 | Loetscher | 260—17.25 |
| 3,108,978 | 10/1963 | McNaughtan | 260—19 |

WILLIAM H. SHORT, *Primary Examiner.*

E. M. WOODBERRY, *Assistant Examiner.*